Aug. 8, 1950 L. A. WIRTH 2,518,412
GREASE GUN BRACKET
Filed Jan. 27, 1947

Inventor
Lawrence A. Wirth
By Lewis D. Konigsford
Attorney

Patented Aug. 8, 1950

2,518,412

UNITED STATES PATENT OFFICE 2,518,412

GREASE GUN BRACKET

Lawrence A. Wirth, Evansville, Ind.

Application January 27, 1947, Serial No. 724,537

1 Claim. (Cl. 248—316)

The present invention relates to improvements in tractor equipment, and relates particularly to an improvement in grease gun brackets adapted to be secured in place upon a tractor or other machine.

In ordinary use of a farm tractor, it frequently is necessary to grease the working parts of the tractor or the implement drawn thereby while the tractor is in the field. Heretofore, no provision has been made for carrying a grease gun with the tractor, so that either the lubrication of the tractor and equipment drawn thereby is neglected, or the tractor and equipment is returned to the storage building to be lubricated, with consequent loss of useful operating time.

It is an object of the present invention to provide a support for a lubrication gun upon a tractor, which is readily accessible, and which is located in position where it will not interfere with the operation thereof.

A further object is the provision of a bracket for a grease gun on a tractor which is inexpensive to make, simple in construction, and which can be readily secured in position thereon.

A further object is the provision of a grease gun bracket which will hold the grease gun against accidental displacement, and from which it can be readily removed.

For a detailed description of the invention, reference is made to the following specification taken in connection with the accompanying drawing, wherein I have shown a preferred embodiment of the invention by way of example, and wherein.

Figure 1:
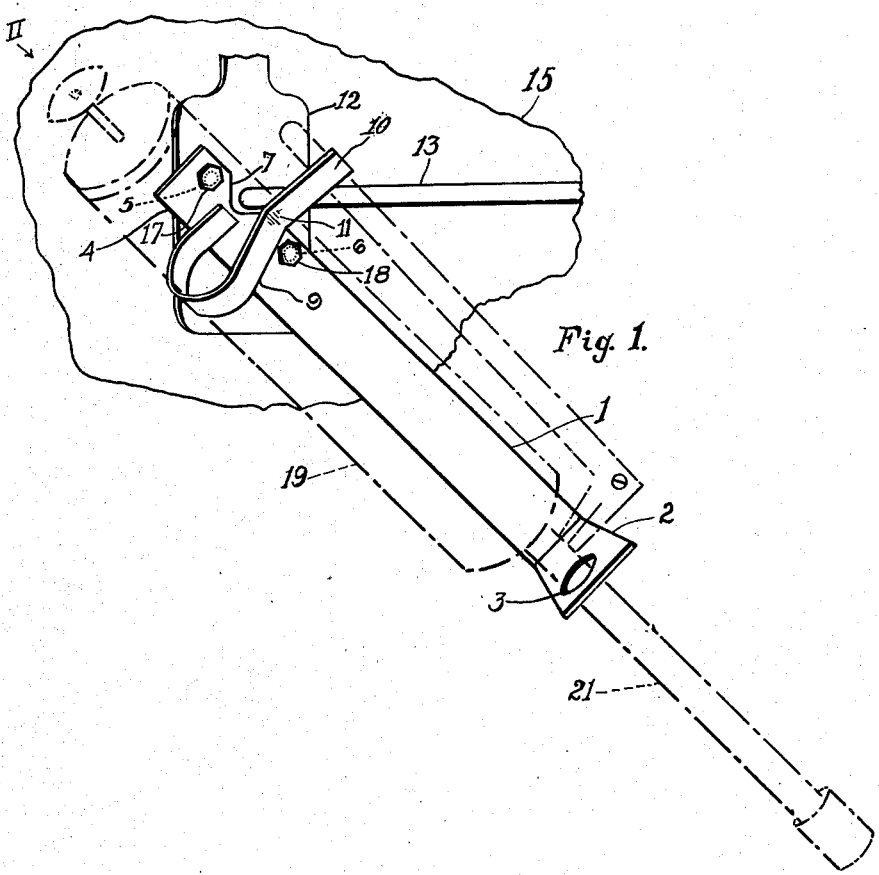
Figure 1 is a side elevation of the invention.
Figure 2:
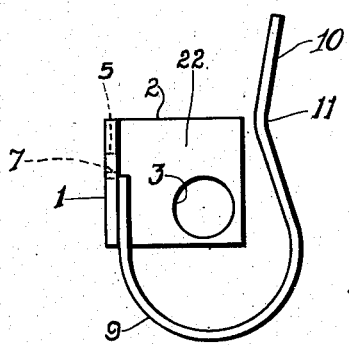
Figure 2 is an end view of Figure 1, looking in the direction of the arrow II—II.

Referring to Figure 1 of the drawing, there is illustrated a member 1 in the form of a bar or the like which has its lower end 2 bent, and an aperture 3, shown as circular in form and of suitable size, is provided in the bent end. Adjacent the opposite end 4 of the bar are located apertures 5 and 6, and a notch 7 preferably is formed at this end for a purpose to be later described. A strap or band 9 is located at this end of the bar, and may be integral with the bar. Preferably, this strap 9 is welded to the bar 1 and is curved on a suitable radius to accommodate the barrel of the grease gun, and the strap is reversely bent at 11 to provide a flared end 10.

The bracket thus described preferably is secured to a tractor or other implement or machine by means of bolts 17 and 18 passing through the apertures 5 and 6. I prefer to secure the bracket to the rear light bracket 12 of a tractor by means of the bolts usually employed for holding the rear light bracket upon the rear fender 15, and the notch 7 thus accommodates the end of rib 13 upon the rear fender 15 of the tractor, the light bracket 12 and grease gun bracket thus being held on the fender by the bolts 17 and 19. The grease gun 19, shown in dot and dash lines, has a nozzle 21 which is received in the hole 3 at the end 2 of the bracket, and the barrel of the grease gun may be forced between the flared end 10 of the strap and the bar 1 to the position illustrated in Figure 1, the resiliency of the curved strap 9 holding the grease gun barrel in place against the bar 1 and preventing it from being jolted out of the bracket, or being otherwise accidentally dislodged.

To remove the grease gun, the handle or barrel is grasped by the operator and the barrel is lifted against the resilient pressure of the strap 9 through the space 22 provided between the strap 9 and bar 1, and the nozzle end may be withdrawn then from the hole 3 in the bent end 2 of the bar.

The invention may be embodied in other specific forms without departure from the spirit or essential characteristics thereof. The specific form described herein, therefore, is to be considered in all respects as illustrative and not restrictive of the invention.

What I claim as my invention and desire to secure by Letters Patent is:

A bracket member adapted to hold a grease gun comprising a supporting bar having an angular extension adjacent one end for holding the nozzle end of the grease gun, a resilient band having one end integrally secured adjacent the opposite end of said bar and having a free end adapted to embrace the barrel of the grease gun and press said gun against said bar, said bracket member having two holes whereby it may be bolted to a tractor fender in inclined position, and a notch between said holes to accommodate the reenforcing rib of said tractor fender.

LAWRENCE A. WIRTH.

REFERENCES CITED

The following references are of record in the file of this patent:

UNITED STATES PATENTS

| Number | Name | Date |
|---|---|---|
| 1,442,712 | Doerner | Jan. 16, 1923 |

FOREIGN PATENTS

| Number | Country | Date |
|---|---|---|
| 533,886 | France | Mar. 13, 1922 |
| 564,593 | France | Jan. 5, 1924 |